Patented June 20, 1944

2,351,941

UNITED STATES PATENT OFFICE 2,351,941

PRODUCING ALUMINA

Walter Dyckerhoff, Mainz-Amoneburg, and Wilhelm Wittekindt, Wiesbaden-Biebrich, Germany; vested in the Alien Property Custodian No Drawing. Application April 29, 1941, Serial No. 391,007. In Germany April 20, 1940

3 Claims. (Cl. 23—143)

This invention relates to improvements in the production of alumina from aluminous raw materials.

One has already proposed to recover alumina by heating such raw material with lime to solubilize or "open" it, and dissolving the resulting calcium aluminates by lixiviating the opened material with soda solution. This mode of operating presents the important draw-back that besides the alumina a considerable amount of silicic acid is dissolved which on working up the solution is precipitated together with the alumina and prohibits the immediate use of the alumina thus obtained for a number of purposes, especially for producing aluminum. Therefore one has preferred to lixiviate the calcined product with water alone instead of soda solution. Calcium aluminates being soluble in water only to a small extent, considerable quantities of liquid are required for this purpose, and as a rule solutions containing only 1 g. $Al_2O_3$ per liter are obtained. Even when employing a diluted soda solution containing less than 1 g. $Na_2CO_3$ per liter still considerable quantities of liquid are needed, although the solutions do not contain notable percentages of $SiO_2$.

Now we have found the surprising fact that a solution with higher alkali metal carbonate contents may be employed if in the lixiviating operation greater amounts of lixiviated material are present besides the calcined product. It appears that the $SiO_2$ contents, at first present in the lixiviating liquid, practically disappear with the progressive enrichment of the solution with lixiviated material. Contrary to what a man skilled in the art could expect, the silicious residue freed from alumina counteracts the dissolution of silicic acid or precipitates the silicic acid already dissolved.

Therefore this process affords the possibility of employing a silicious lime in order to bind the excess of carbonic acid when the alkali metal carbonate solution resulting from the circulation is utilised, which solution after the precipitation of the alumina still contains considerable quantities of carbonic acid, because even with higher silicic acid content of such solution the dissolved amount of silicic acid is again precipitated in the lixiviating process. Hereby the economy of the process is considerably improved, owing to the fact that now for neutralizing the solutions obtained from the carbon dioxide saturator we are no more obliged to rely upon the use of the purest lime. In order to avoid, in the beginning of the process, the dissolution of greater amounts of silicic acid, it has proved preferable to effect the lixiviation at first in presence of an excess of the material to be lixiviated.

The invention will now be more fully explained with reference to a numerical example of execution:

100 kilograms of a raw aluminous material containing 25% of $Al_2O_3$ are intimately mixed with about 150 kilograms of carbonate of lime containing 96% of $CaCO_3$ and the whole is subjected to a calcining process at temperatures of from 1000 to 1450° C. The calcined product is then lixiviated with a soda solution containing about 5 grams sodium carbonate per liter. About 20 to 25 grams of fresh material besides 60 to 200 grams of already lixiviated material from former operations should be used per each liter of solution. The resulting solution contains about 2 grams of alumina per liter and is practically free from silicic acid. By analysis we have tested that this solution contains about 0.02 to 0.06% $SiO_2$, calculated upon the $Al_2O_3$ content. The aluminous solution thus obtained may then be treated in the well-known manner, for obtaining pure alumina, e. g. by precipitating it with carbon dioxide.

Instead of soda solution any other alkaline solution, for instance, caustic soda or potash solution may be employed for lixiviating the calcined product. Likewise in the "calcining" operation an alkaline earth other than lime may be used.

We claim:

1. The process of recovering alumina from aluminous raw materials which comprises mixing the raw materials with an alkaline earth, calcining the mixture, lixiviating the calcined product with alkali metal carbonate solution in presence of a considerable amount of a similar product obtained from a former operation, already lixiviated and consisting largely of silica residue, and precipitating alumina from the resulting alkali metal aluminate solution.

2. The process of recovering alumina from aluminous raw materials which comprises mixing the raw materials with an alkaline earth, calcining the mixture, lixiviating one part by weight of the calcined product with alkali metals carbonate solution in presence of three to six parts by weight of the calcined product obtained from a former operation, already lixiviated and consisting largely of silica residue, and precipitating alumina from the resulting alkali metal aluminate solution.

3. The process of recovering alumina from aluminous raw materials which comprises mixing the raw materials with lime, calcining the mixture, lixiviating the calcined product with alkali metal carbonate solution in presence of a considerable amount of a similar product obtained from a former operation, already lixiviated and consisting largely of silica residue, introducing carbon dioxide into the resulting alkali metal aluminate solution, thereby precipitating alumina, treating the resulting alkali metal bicarbonate solution with silicious lime to remove its excess of carbon dioxide, and repeating the process with the resulting alkali metal carbonate solution.

WALTER DYCKERHOFF.
WILHELM WITTEKINDT.